US011919195B2

(12) United States Patent
Capaccioli

(10) Patent No.: US 11,919,195 B2
(45) Date of Patent: Mar. 5, 2024

(54) APPARATUS FOR FORMING SOFT MUD CLADDING AND PAVING ARTICLES

(71) Applicant: CAPACCIOLI-S.R.L., Frazione Pieve (IT)

(72) Inventor: Stefano Capaccioli, Lucignano (IT)

(73) Assignee: CAPACCIOLI-S.R.L., Sinalunga (IT)

( * ) Notice: Subject to any disclaimer, the term of this patent is extended or adjusted under 35 U.S.C. 154(b) by 0 days.

(21) Appl. No.: 17/955,623

(22) Filed: Sep. 29, 2022

(65) Prior Publication Data

US 2023/0096449 A1 Mar. 30, 2023

(30) Foreign Application Priority Data

Sep. 30, 2021 (IT) ........................ 102021000025049

(51) Int. Cl.
*B28B 11/08* (2006.01)

(52) U.S. Cl.
CPC ................................ *B28B 11/0845* (2013.01)

(58) Field of Classification Search
CPC .. B28B 11/0845; B28B 5/022; B28B 13/0205
See application file for complete search history.

(56) References Cited

U.S. PATENT DOCUMENTS 2,495,960 A * 1/1950 George ............... B28B 11/0845 425/219
2,545,366 A * 3/1951 Madryl .................. B28B 5/025 425/219
4,917,838 A 4/1990 Rensen

FOREIGN PATENT DOCUMENTS

CN 112976233 A * 6/2021
EP 0 250 017 A1 12/1987
EP 0 365 099 A1 4/1990
EP 0365099 A1 * 4/1990
FR 609 830 A 11/1920

OTHER PUBLICATIONS

Italian Search Report dated Jun. 9, 2022 received in Italian Patent Application No. 2021000025049, together with an English-language translation.

* cited by examiner

*Primary Examiner* — Alison L Hindenlang
*Assistant Examiner* — Irak Nguon
(74) *Attorney, Agent, or Firm* — Scully, Scott, Murphy & Presser, P.C.

(57) ABSTRACT

An apparatus for forming soft mud cladding or paving articles, comprising
- an assembly for loading a mix in a mold box which is open upward and is provided with at least one impression for forming a corresponding blank provided with a laying surface which faces toward the outside of the impression, the mold box being movable along an advancement direction through the loading assembly,
- elements for skimming excess material loaded into the mold box,
- at least one assembly for overturning the mold box for the extraction of the at least one blank,
- an assembly for drying and firing the at least one blank so as to obtain a corresponding cladding article;
- the skimming elements comprise at least one skimming element which is forms at least one profile which substantially matches the profile of the laying surface of the blank being processed.

7 Claims, 5 Drawing Sheets

APPARATUS FOR FORMING SOFT MUD CLADDING AND PAVING ARTICLES

The present invention relates to an apparatus for forming soft mud cladding and paving articles.

In the field of building materials, apparatuses are known for the production of cladding and paving articles obtained starting from mixes based on clay-like materials and other suitable raw materials mixed with water, so-called "soft mud."

As regards clay building components, in particular, apparatuses are known which consist essentially of a station for loading the mix into a mold box which is open in an upper region and forms one or more impressions for forming respective blanks, of a station for extracting the blanks by overturning the mold boxes, and a step for drying and firing the blanks to obtain finished articles.

An example of such a type of apparatus is described in EP 1027971 A1 in the name of this same Applicant.

This solution provides for a skimming assembly in order to cut and remove the excess material deposited on the mold box exiting the loading station.

This skimming assembly provides for the use of a metallic wire which is moved above the mold box so as to trace a cutting plane of the material that is substantially tangent to the mold box.

This apparatus of the known type is not without drawbacks, which include the fact that it does not allow to perform a precise control of the thickness and surface finish of the obtained articles and therefore it is not suitable for the production of cladding articles.

Such articles, generally of small thickness, have their laying surface at the face that is skimmed as described above. This laying surface must have adequate characteristics of flatness and surface finish in order to allow a stable adhesion of the article to the surface to be cladded by interposition of adhesives.

Therefore, for the production of cladding articles with conventional apparatuses of the type described above, a step for the surface finishing of the laying surface by grinding must generally be provided which negatively affects manufacturing times and costs.

Furthermore, the flush skimming system must be subjected to periodic maintenance interventions, with the consequent need to stop the operation of the apparatus.

Moreover, apparatuses of the traditional type have some limitations regarding the geometry of the articles that can be provided and do not allow, for example, to obtain L-shaped angular articles.

These angular articles are used in conjunction with flat strips for the integral cladding of the external surfaces of buildings so as to obtain an exposed face finish as if they were made entirely of exposed brick.

In order to obtain the flat strips and angular articles with exposed finish it is known to proceed with cutting processes starting from fired bricks so as to cut a pair of flat strips or an angular article, discarding the remaining portion of said bricks.

This method of operation, besides requiring non-negligible execution times, entails the forming of significant quantities of waste material, with consequent waste of the raw materials and energy used to make the source bricks.

As an alternative, it is known to provide said flat strips and corner articles with exposed finish shaped by pouring mix into dedicated mold boxes.

This procedure entails long execution times, which increase the production costs of the articles.

The aim of the present invention is to eliminate the drawbacks mentioned above of the background art, by devising an apparatus for forming soft mud cladding and paving articles that allows to perform a reliable and time-constant control of the surface finish and of the dimensional tolerances of the articles being processed, so as to allow the provision of articles for the cladding of surfaces.

Within this aim, an object of the present invention is to allow the provision of planar and non-planar articles, regardless of their geometry, and with different surface finishes of the face designed to remain exposed during laying.

A further object of the present invention is to reduce processing times and costs for the provision of articles with exposed finish.

Not last object of the present invention is to have a structure that is simple, relatively easy to provide in practice, of assured application, effective in operation, and of relatively low cost.

This aim and these and other objects which will become better apparent hereinafter are all achieved by the present apparatus for forming soft mud cladding and paving articles according to claim 1 that follows and optionally provided with one or more of the characteristics according to the dependent claims.

Further characteristics and advantages of the present invention will become better apparent from the detailed description of a preferred but not exclusive embodiment of an apparatus for forming soft mud cladding or paving articles, illustrated by way of non-limiting example in the accompanying drawings, wherein.

Figure 1:
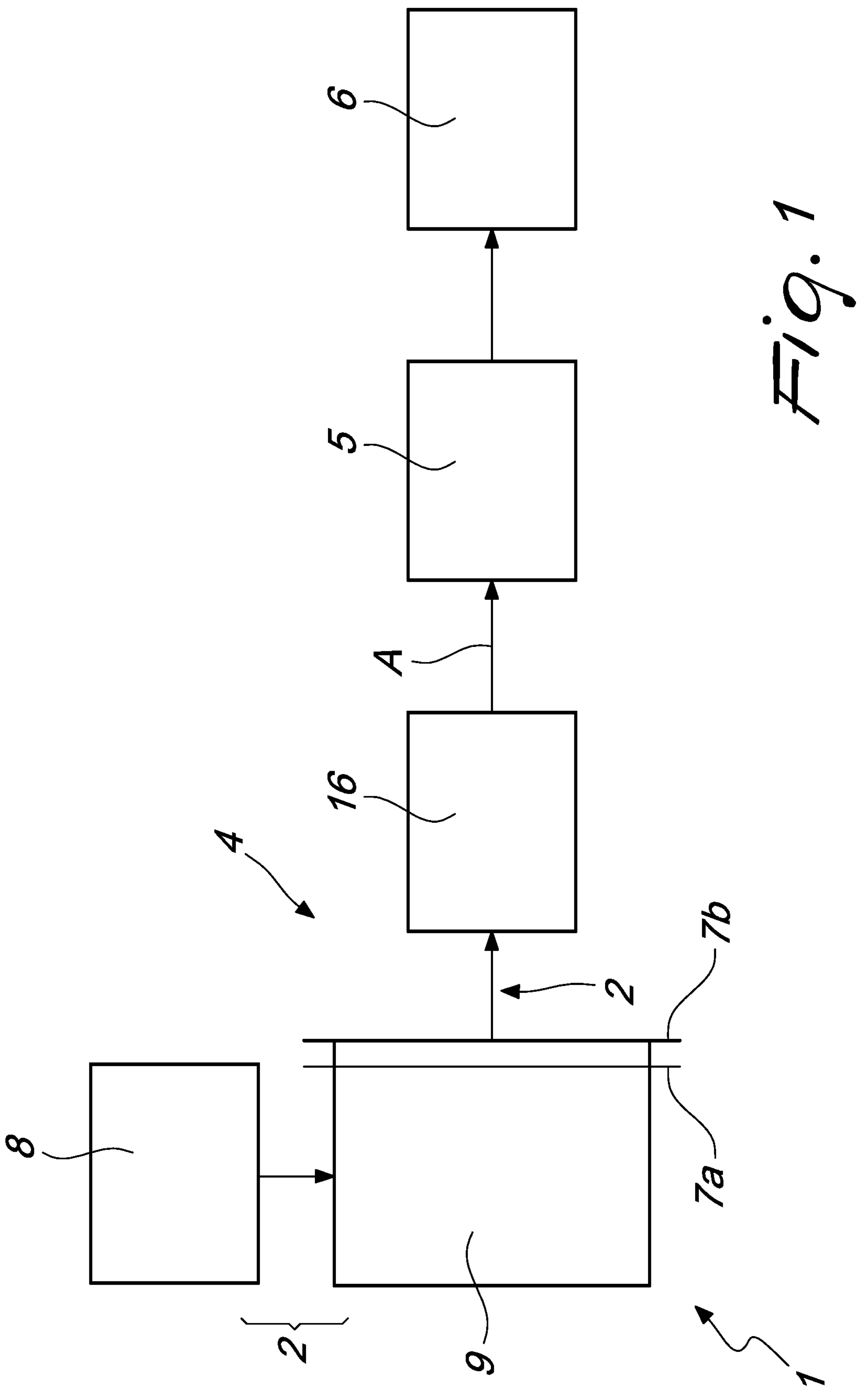
FIG. 1 is a schematic view of an apparatus for forming soft mud cladding and paving articles, according to the invention.
Figure 2:
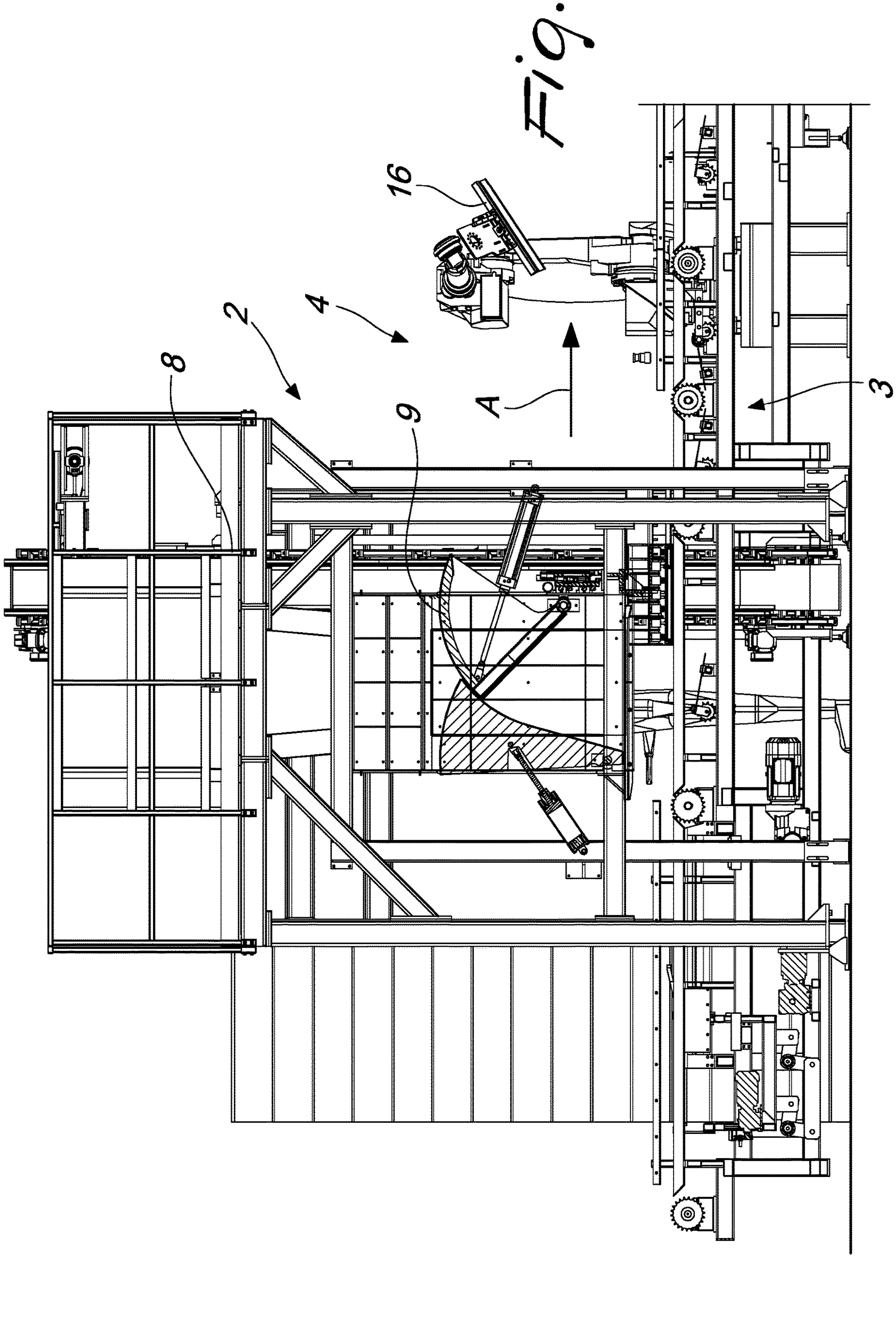
FIG. 2 is a partial front elevation view of the apparatus according to the invention.
Figure 3:
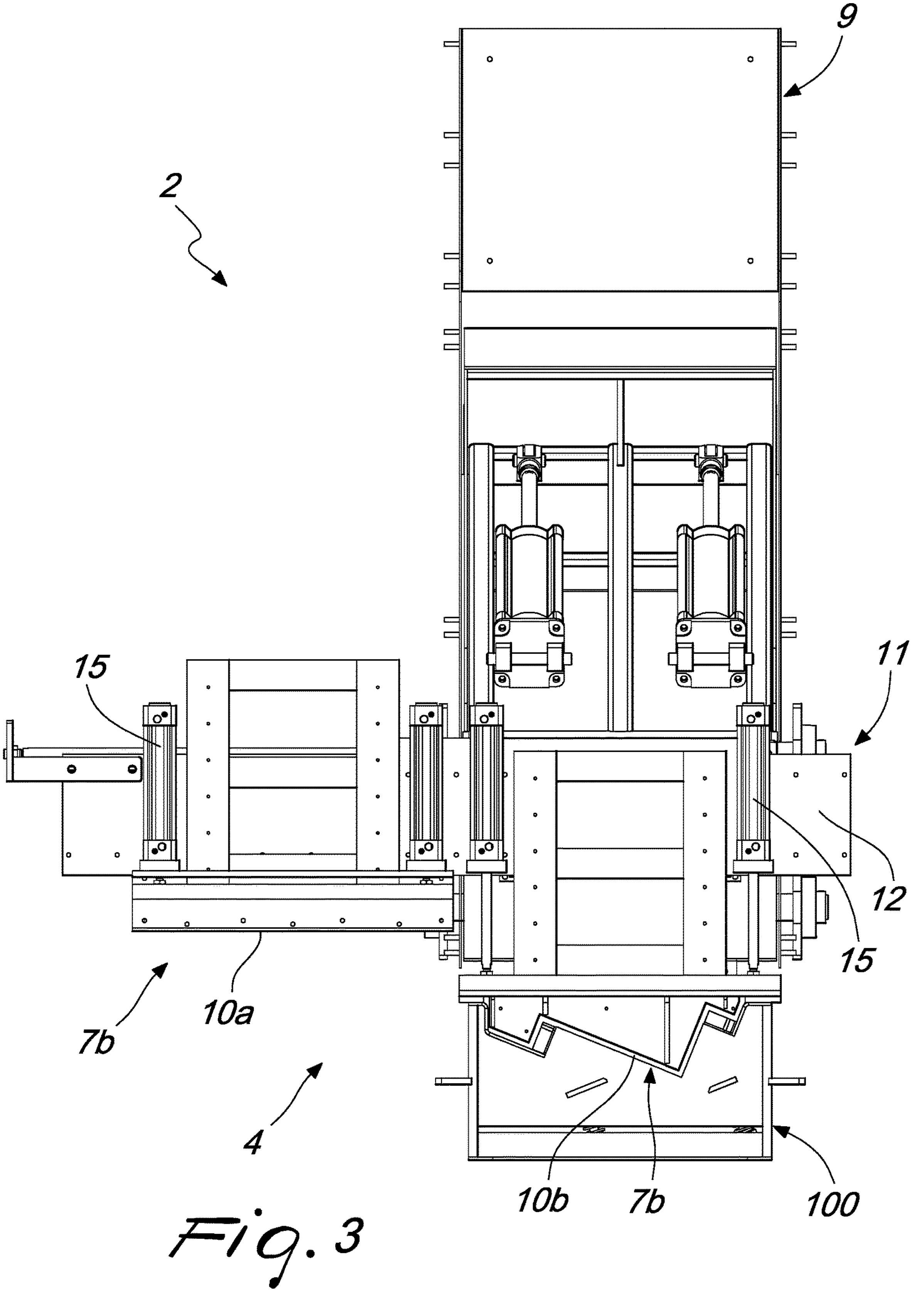
FIGS. 3 and 4 are respective side and partial views of the loading assembly and of the skimming means of the apparatus according to the invention.
Figure 4:
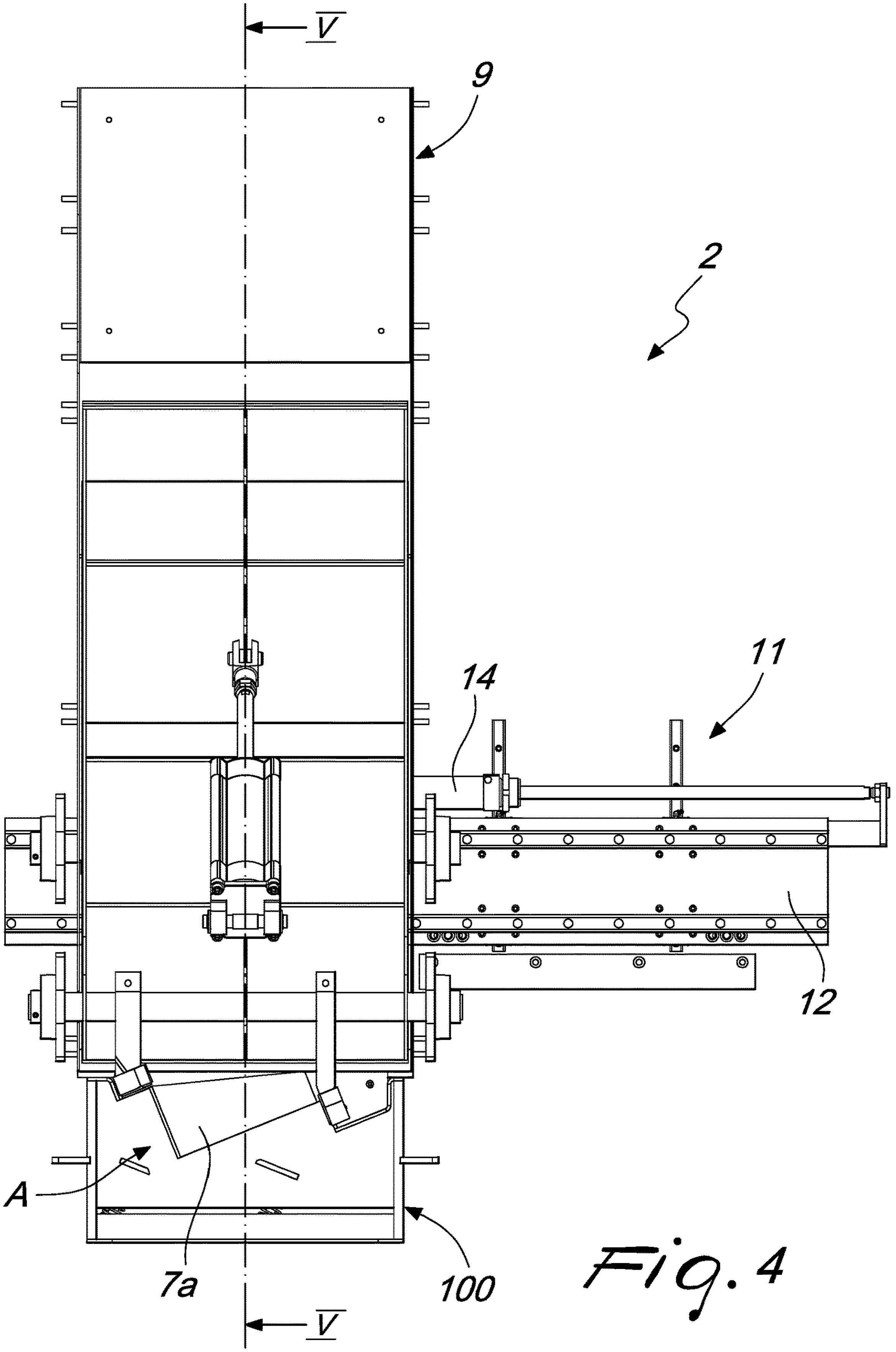
Figure 5:
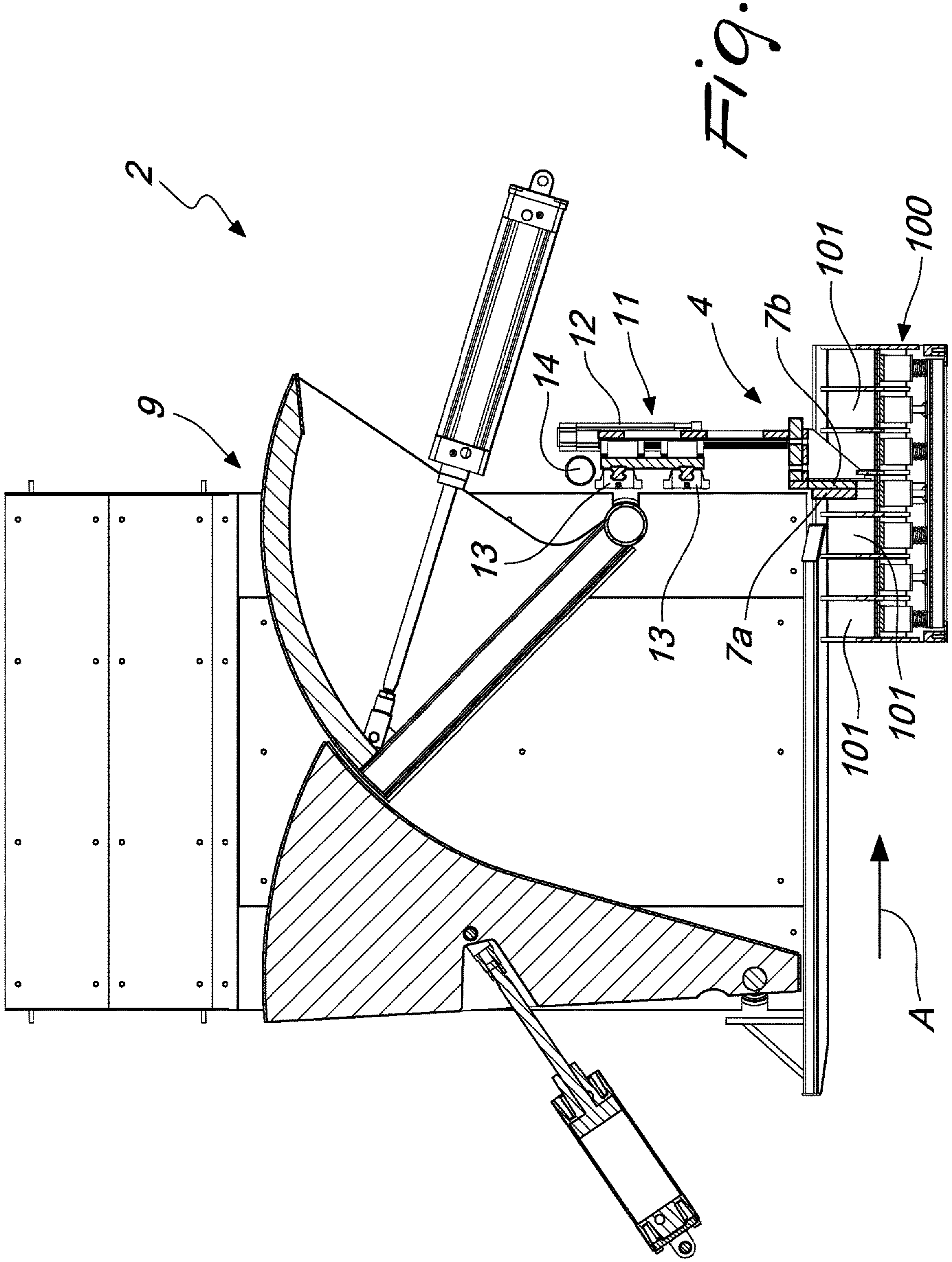
FIG. 5 is a sectional view, taken along the sectional plane V-V of FIG. 4.

With reference to the figures, an apparatus for forming soft mud cladding and paving articles is generally designated by the reference numeral 1. Said articles can be made, for example, of fired clay, brick or ceramics in general.

The apparatus 1 comprises an assembly 2 for loading a mix based on water and clay or the like into a mold box 100 which is open upward and is provided with at least one impression 101 for forming a corresponding blank provided with an exposed surface in contact with said impression and with a laying surface which faces toward the outside of said impression.

In use, the laying surface of the article is adapted to adhere to the surface to be cladded, floor or wall, while the exposed surface is designed to remain exposed and visible.

Generally, the mold box 100 has a plurality of impressions 101 for forming corresponding blanks the corresponding laying surfaces of which are arranged substantially coplanar, regardless of the corresponding geometries.

In the present description, the term "substantially" is understood to mean within the usual machining and assembly tolerances of the component parts.

The loading assembly 2 typically provides for an assembly 8 for mixing the mix which feeds an assembly 9 for pressing said mix inside the mold box 100, both of the conventional type and therefore not detailed.

The apparatus 1 also provides for a system 3 for transferring the mold box 100 along an advancement direction A through the loading assembly 2. The transfer system 3 preferably allows to manage the movement of the mold box 100 also through the subsequent processing stations and the return of the empty mold box 100 to the inlet of the loading assembly 2. Said transfer system 3 can consist, for example, of one or more continuous conveyors arranged in succession, not described in detail since they are of a known type.

Preferably, the apparatus 1 provides for a series of mold boxes 100 which are moved through the loading assembly 2 by means of the transfer system 3.

The apparatus 1 comprises means 4 for skimming the excess material loaded into the mold box 100 in order to finish said laying surface of the blank being processed.

According to the invention, the skimming means 4 comprise at least one skimming element, which forms at least one profile which substantially matches the profile of the laying surface of the blank being processed, which is arranged along the advancement direction A proximate to the region where the mold box 100 exits from the loading assembly 2.

Preferably, the skimming element remains fixed along the advancement direction A during the transit of the mold box 100 along said direction, so that the corresponding profile is substantially tangent to the laying surface of the articles in transit.

The apparatus 1 subsequently comprises at least one assembly 5 for overturning the mold box 100 for the extraction of the blanks and an assembly 6 for drying and firing said blanks in order to obtain the finished cladding articles.

The overturning assembly 5 can provide, for example, a conventional manipulation robot for the movement of a gripper for gripping and extraction from the mold box 100 or other systems of a known type.

Different overturning assemblies 5 can be provided for the extraction from the mold box of articles having a different format.

The drying and firing assembly 6 can provide, for example, a traditional kiln followed by an oven, also of a known type.

Even more preferably, the skimming means can provide for at least two skimming elements 7*a* and 7*b* which are arranged in series along the advancement direction A. In this case, there is a first coarse skimming element 7*a* and there is at least one second finishing skimming element 7*b* which is arranged downstream of the preceding one along the advancement direction A.

The first skimming element 7*a* provides the removal of a first layer of excess material on the laying surface of the articles M and the second skimming element 7*b* provides the removal of a second layer of material below the first one, if necessary.

In the preferred embodiment of the apparatus 1, the first skimming element 7*a* is arranged inside the loading assembly 2 proximate to the region where the mold box 100 exits from the pressing assembly 9 and the at least one second skimming element 7*b* is arranged again inside said assembly at the exit region of the mold box 100 along the advancement direction A. In this manner, the excess material that is removed by the skimming elements 7*a* and 7*b* remains inside the loading assembly 2, avoiding its waste.

As the geometry of the articles being processed and the shape of the corresponding laying surface change, it is necessary to provide skimming elements 7*a* and 7*b* having corresponding profiles.

In this case, the first skimming element 7*a* can be replaced with another one having an appropriate profile as the geometry of the articles being processed changes.

Advantageously, it is possible to provide two second skimming elements 7*b* having differently shaped respective profiles 10*a* and 10*b*, which are adapted to be arranged alternately along the advancement direction A as a function of the geometry of the articles being processed.

In the embodiment shown, the first profile 10*a* is linear for the skimming of substantially planar articles, such as strips, and the second profile 10*b* is shaped for the skimming of angular L-shaped articles.

The second skimming elements 7*b* are arranged so as to be aligned transversely to the advancement direction A and the skimming means 4 comprise means 11 for moving the second skimming elements 7*b* in an alternating translational motion transversely to the advancement direction A, so as to arrange one of the two profiles 10*a* or 10*b* at the region where the mold box 100 exits from the loading assembly 2 along the advancement direction A. By modifying the second skimming element 7*b* in use it is possible to change automatically the setup of the apparatus 1 as a function of the format of the articles being processed.

The moving means 11 comprise a bar 12 for supporting the profiles 10*a* and 10*b* which is associated with the wall of the loading assembly 2 and is arranged at the exit region of the mold box 100. The bar 12 is associated so as to slide on guides 13 which are horizontal and transverse to the advancement direction A. The movement means 11 also comprise a first actuator 14 for actuating in alternating translational motion the bar 12 along the guides 13.

Furthermore, each one of the profiles 10*a* and 10*b* is associated with the bar 12 so that it can move with an alternating translational motion in a substantially vertical direction, between an active lowered configuration and an inactive raised configuration. The moving means 11 comprise a pair of second actuators 15 for actuating in alternating translational motion each profile 10*a* and 10*b* with respect to the bar 12.

Furthermore, the skimming means 4 comprise a manipulation robot 16 for the movement of a finishing element on the laying surface of the articles being processed, which is interposed between the loading assembly 2 and the overturning assembly 5.

In this manner, the achievement of a dimensional tolerance and of a surface finish of the articles being processed, even of reduced thickness, which are suitable to be used for the cladding of surfaces, is ensured.

It should be noted that in the mold box 100 used in the apparatus 1 each impression 101 comprises at least one bottom wall which faces the exposed surface of the corresponding blank, and interchangeable inserts can be provided which are to be associated with said bottom wall so as to obtain different surface finishes of the exposed surface based on the specific requirements.

For providing planar articles such as flat strips, the impression 101 for forming each blank has a substantially flat shape. In this case, the overturning assembly 5 has a substantially planar surface for the resting of the blanks extracted from the mold box.

In order to obtain angular articles provided with two mutually inclined wings, instead, the impression 101 for forming each blank is substantially L-shaped at 90° or according to the desired angle. In this case, the overturning assembly 5 can provide for the use of at least one wedge-like or differently shaped element for resting the blanks extracted from the mold box.

In practice it has been found that the invention described achieves the intended aim and objects and in particular the fact is stressed that the apparatus according to the invention allows to provide a precise finish of the laying surface of the articles being processed, regardless of their thickness or geometry, making them suitable for use as cladding or paving articles.

Moreover, the apparatus according to the invention allows to reduce the production times and costs of said cladding or paving articles.

The invention thus conceived is susceptible of numerous modifications and variations, all of which are within the scope of the appended claims.

All the details may furthermore be replaced with other technically equivalent elements.

In practice, the materials used, as well as the contingent shapes and dimensions, may be any according to the requirements without thereby abandoning the protective scope of the claims that follow.

The disclosures in Italian Patent Application No. 102021000025049 from which this application claims priority are incorporated herein by reference.

What is claimed is:

1. An apparatus for forming soft mud cladding or paving articles, comprising an assembly for loading a mix in a mold box which is open upward and is provided with at least one impression for forming a corresponding blank provided with an exposed surface in contact with said impression and with a laying surface which faces toward an outside of said impression, the mold box being movable along an advancement direction through the loading assembly, means for skimming excess material loaded into the mold box in order to finish the laying surface of said at least one blank, at least one assembly for overturning said mold box for extracting said at least one blank, an assembly for drying and firing said at least one blank so as to obtain a corresponding cladding article, wherein said skimming means comprise at least one skimming element which forms at least one profile which substantially matches a profile of the laying surface of the blank being processed, which is arranged along the advancement direction proximate to a region where said mold box exits from said loading assembly, wherein said skimming means comprise at least two of said skimming elements which are arranged in series along the advancement direction, of which a first coarse skimming element and at least one second finishing skimming element arranged downstream of the first coarse skimming element along the advancement direction, wherein said first skimming element is arranged proximate to the exit region of said mold box within said loading assembly, wherein said skimming means comprise two of said second skimming elements which have different profiles and are adapted to be arranged alternately along the advancement direction as a function of a geometry of the blank being processed; and wherein said two second skimming elements are arranged so as to be aligned transversely to the advancement direction and said skimming means comprise means for moving said second skimming elements in an alternating translational motion transversely to the advancement direction.

2. The apparatus according to claim 1, wherein said at least one skimming element is fixed along the advancement direction during a transfer of said mold box along said advancement direction.

3. The apparatus according to claim 1, wherein said at least one second skimming element is arranged at the exit region of said mold box within said loading assembly.

4. The apparatus according to claim 1, wherein said skimming means comprise a manipulation robot for handling a finishing element which is interposed between said loading assembly and said overturning assembly.

5. The apparatus according to claim 1, wherein said at least one impression comprises at least one bottom wall which faces the exposed surface of the corresponding blank, interchangeable inserts being provided which are configured to be associated with said bottom wall so as to obtain different surface finishes of said exposed surface.

6. The apparatus according to claim 1, wherein said at least one impression has a substantially planar shape, the overturning assembly comprising a substantially planar surface for resting the blanks extracted from the mold box.

7. The apparatus according to claim 1, wherein said at least one impression is substantially L-shaped according to a desired angle, the overturning assembly comprising at least one element which is shaped for resting the blanks extracted from the mold box.

* * * * *